US012662872B2

(12) United States Patent
Jiang et al.

(10) Patent No.: US 12,662,872 B2
(45) Date of Patent: Jun. 23, 2026

(54) ELECTRIC CURTAIN

(71) Applicant: NINGBO SUNFREE MOTOR TECHNOLOGY COMPANY LIMITED, Ningbo City (CN)

(72) Inventors: Chun Jiang, Ningbo City (CN); Baoguo Tan, Ningbo City (CN)

(73) Assignee: NINGBO SUNFREE MOTOR TECHNOLOGY COMPANY LIMITED, Ningbo City (CN)

( * ) Notice: Subject to any disclaimer, the term of this patent is extended or adjusted under 35 U.S.C. 154(b) by 308 days.

(21) Appl. No.: 18/243,636

(22) Filed: Sep. 7, 2023

(65) Prior Publication Data

US 2024/0093551 A1 Mar. 21, 2024

(51) Int. Cl.
*E06B 9/322* (2006.01)

(52) U.S. Cl.
CPC ...... *E06B 9/322* (2013.01); *E06B 2009/3225* (2013.01)

(58) Field of Classification Search
CPC .... E06B 9/32; E06B 9/322; E06B 2009/2625; E06B 2009/3222; E06B 2009/3225
See application file for complete search history.

(56) References Cited

U.S. PATENT DOCUMENTS 7,517,609 B2 * 4/2009 Cheng .................... E06B 9/323 429/97
7,857,030 B2 * 12/2010 Cheng .................... E06B 9/322 160/84.02
8,820,388 B2 * 9/2014 Mullet .................... E06B 9/322 160/310
8,939,190 B2 * 1/2015 Mullet .................... E06B 9/322 160/DIG. 17
9,091,115 B2 * 7/2015 Mullet .................... E06B 9/322
9,103,157 B2 * 8/2015 Mullet .................... E06B 9/62
(Continued)

FOREIGN PATENT DOCUMENTS

CN 204984224 U 1/2016
CN 211173858 U 8/2020
(Continued)

OTHER PUBLICATIONS

PCT International Search Report mailed Sep. 15, 2022 in corresponding PCT application PCT/CN2022/144395, 5 pages in Chinese.

*Primary Examiner* — Johnnie A. Shablack
(74) *Attorney, Agent, or Firm* — Juan Carlos A. Marquez; Marquez IP Law Office, PLLC

(57) ABSTRACT

An electric curtain is provided which comprises a top rail, a bottom bar, a curtain body, a rope winding assembly, a drive device and an end seal; the top rail and the bottom bar are disposed in parallel up and down with the curtain body in between; the top rail is provided with opposed first end and second end; the end seal is disposed at the first end of the top rail and the drive device at the second end; the drive device is in transmission connection with the rope winding assembly; the drive device comprises a motor part and a power supply part; the motor part is disposed inside the top rail and connected to the rope winding assembly in a transmission manner; the power supply part is disposed outside the top rail; the motor part and the power supply part are disposed in parallel inside and out.

8 Claims, 6 Drawing Sheets

(56) References Cited

U.S. PATENT DOCUMENTS

| | | | | |
|---|---|---|---|---|
| 11,002,071 | B2 * | 5/2021 | Campagna | E06B 9/72 |
| 12,123,256 | B2 * | 10/2024 | Jin | E06B 9/323 |
| 12,152,436 | B2 * | 11/2024 | Kirby | E06B 9/322 |
| 12,291,922 | B2 * | 5/2025 | Chen | E06B 9/264 |
| 2003/0168187 | A1 * | 9/2003 | Wen | E06B 9/32<br>160/168.1 P |
| 2006/0169419 | A1 * | 8/2006 | Cheng | E06B 9/32<br>160/168.1 P |
| 2010/0092855 | A1 * | 4/2010 | Cheng | H01M 50/213<br>429/163 |
| 2012/0261079 | A1 * | 10/2012 | Chambers | E06B 9/68<br>160/1 |
| 2020/0300036 | A1 * | 9/2020 | Tan | E06B 9/322 |
| 2021/0203207 | A1 * | 7/2021 | Jiang | E06B 9/72 |
| 2022/0065038 | A1 * | 3/2022 | Liang | E06B 9/70 |
| 2022/0228436 | A1 * | 7/2022 | Jiang | H02K 7/003 |
| 2022/0333438 | A1 * | 10/2022 | Huang | E06B 9/322 |
| 2024/0093551 | A1 * | 3/2024 | Jiang | E06B 9/262 |
| 2024/0097534 | A1 * | 3/2024 | Jiang | H02K 11/215 |
| 2024/0384591 | A1 * | 11/2024 | Bohlen | E06B 9/323 |

FOREIGN PATENT DOCUMENTS

| | | | | |
|---|---|---|---|---|
| CN | 211342684 U | | 8/2020 | |
| CN | 211623245 U | | 10/2020 | |
| CN | 213743153 U | | 7/2021 | |
| CN | 114555903 A | | 5/2022 | |
| CN | 218844197 U | | 4/2023 | |
| JP | 3248710 U | * | 10/2024 | E06B 9/307 |
| WO | 2022126749 A1 | | 6/2022 | |

* cited by examiner

ELECTRIC CURTAIN

This application is based upon and claims priority to Chinese Patent Application No. 202211123851.6, filed on Sep. 15, 2022, the entire contents of which are incorporated herein by reference.

TECHNICAL FIELD

The present invention relates to the field of curtain technologies, and in particular to an electric curtain.

BACKGROUND

At present, many common electric curtains such as venetian blinds, honeycomb blinds, and pleated blinds are commercially available. These curtains drive a rope winding assembly via a drive assembly to enable the curtains to open or close. The drive assembly mainly comprises a motor part, a power supply part and a control part. The motor part is used to output power to drive the rope winding assembly to work, the power supply part is used to supply electricity, and the control part is used to control the motor part to work.

In most of the existing electric curtains, the motor part, the power supply part and the control part are three independent structures which are not integrated into one integral structure. For example, the motor part is usually mounted inside the top rail of the curtain, the control part is mounted outside the top rail, and the power supply part is hung outside the top rail. The motor part, the power supply part and the control part are assembled separately and electrically connected with each other, leading to inconvenient mounting and dismounting. Further, the assembled curtain has potential safety hazards in power supply during transportation.

In some of the existing electric curtains, the motor part, the power supply part and the control part are integrated into one integral structure as a finished drive device which is directly inserted into the top rail to drive the rope winding assembly to open or close the curtain automatically. In this way, quick mounting and dismounting can also be achieved. However, there are still some defects. For example, in a finished straight-line tubular drive device, the motor part, the control part and the power supply part are arranged in a straight-line shape such that the length of the finished drive device is extended. In this case, the limited mounting space of the top rail cannot accommodate the drive device and the rope winding assembly, unless for those very large windows in which the top rail is very long. Thus, it is not applicable to those small windows. For another example, in a U-shaped drive device, the motor part and the power supply part are disposed in parallel up and down such that they can be inserted into an end of the top rail quickly. Thus, the rope winding assembly is driven to automatically open or close the curtain. The length of the drive device is significantly shortened but the height is increased. Correspondingly, the height of the top rail is also increased. Originally, a single cavity on the top rail is sufficient to accommodate the drive device and the rope winding assembly. But at present, two cavities are required to accommodate the drive device and the rope winding assembly, where an upper cavity is used to accommodate the power supply part, and a lower cavity is used to accommodate the motor part and the rope winding assembly, which undoubtedly increases the production costs of the top rail greatly.

In conclusion, it is urgent to find a method to integrate the motor part, the power supply part and the control part into one integral structure, which can be quickly mounted or dismounted without increasing the length or height of the top rail.

SUMMARY

In order to address the above problems of the prior arts, the present invention provides an electric curtain, which can be not only quickly mounted and dismounted but also adapted to long and short windows without increasing the height of a top rail and hence increasing production costs.

In order to address the above technical problems, the present invention provides the following technical solution. An electric curtain is provided, comprising a top rail, a bottom bar, a curtain body, a rope winding assembly, a drive device and an end seal. The top rail and the bottom bar are disposed in parallel up and down. The curtain body is disposed between the top rail and the bottom bar. The top rail is provided with opposed first end and second end. The end seal is disposed at the first end of the top rail. The drive device is disposed at the second end of the top rail. The drive device is in transmission connection with the rope winding assembly to drive the curtain body to close or open. The drive device comprises a motor part and a power supply part. The motor part is disposed inside the top rail and connected to the rope winding assembly in a transmission manner. The power supply part is disposed outside the top rail. The motor part and the power supply part are disposed in parallel inside and out.

Furthermore, the rope winding assembly comprises a pull rope, a transmission rod, and a rope winding device. The rope winding device is disposed inside the top rail. The transmission rod is in transmission connection with the motor part and the rope winding device. One end of the pull rope is fixedly connected to the rope winding device, and the other end runs sequentially through the top rail and the curtain body to be fixedly connected to the bottom bar.

Furthermore, the motor part is provided with opposed third end and fourth end. The third end of the motor part is in transmission connection with the transmission rod, and the fourth end of the motor part is exposed at the second end of the top rail to detachably connect the power supply part.

Furthermore, a slide groove penetrating through both ends of the top rail along a length direction of the top rail disposed on an external surface of the top rail. A slide block slidably matched with the slide groove is disposed on a back surface of the power supply part.

Furthermore, at least one clip for fitting onto the top rail is disposed on an external wall of the motor part. A fitting opening matching the clip is disposed on a side wall of the top rail.

Furthermore, the drive device further comprises a control part. The control part comprises a master control circuit board which is disposed inside the power supply part. A power supply in electrical connection with the master control circuit board is disposed inside the power supply part. An output interface is disposed in an exposed manner at a position close to the fourth end of the motor part on the master control circuit board. An input interface connected to the output interface is disposed in an exposed manner at the fourth end of the motor part.

Furthermore, the motor part is internally provided with a motor core and a speed reducer. The motor core in transmission cooperation with the speed reducer is connected fixedly with the speed reducer. The speed reducer is close to the third end of the motor part, and the motor core is close to the fourth end of the motor part. An output end of the motor core is in transmission connection with an input end of the speed reducer, and an output end of the speed reducer is in transmission connection with the transmission rod. An end of the motor core away from the speed reducer is provided with a Hall plate and a signal magnet. A Hall sensor for sensing the signal magnet is disposed on the Hall plate. The fourth end of the motor part is internally provided with a transitional circuit board which is in electrical connection with the Hall plate. The input interface is disposed on the transitional circuit board.

Furthermore, a first vibration damping sleeve is connected at an end of the speed reducer away from the motor core, and a second vibration damping sleeve is disposed at an end of the motor core away from the speed reducer.

Furthermore, a filling block is disposed at an end of the motor core away from the speed reducer in the motor part. The filling block is abutted against the second vibration damping sleeve to fill a gap between the motor core and the fourth end of the motor part.

Furthermore, the fourth end of the motor part is provided with at least one first magnet and/or first iron block, and an end of the power supply part for docking with the motor part is provided with a second magnetic block and/or second iron block for magnetically attracting the first magnetic block and/or first iron block.

Compared with the prior arts, the present invention has the following advantages: the finished drive device is in transmission connection with the rope winding assembly to drive the curtain body to open and close. The drive device can be quickly mounted on or dismounted from the top rail.

Furthermore, the motor part and the power supply part in the drive device are disposed in parallel. In this case, the motor part can be inserted into the top rail to drive the rope winding assembly, and the power supply part can be exposed outside the top rail, not occupying the internal mounting space of the top rail. Such structure shortens the entire length of the drive device to enable the electric curtain to adapt to long and short windows, while the height of the top rail will not be increased, thus avoiding increase of production costs. Further, the power supply part can also be mounted in an exposed manner, helping charging and replacement. Further, during transportation, the power supply part can be dismounted to prevent potential safety hazards.

BRIEF DESCRIPTION OF THE DRAWINGS

In order to describe the embodiments of the present invention or the technical solution of the prior art more clearly, brief descriptions will be made below to the accompanying drawings involved in descriptions of the embodiments or the prior art. Obviously, the accompanying drawings are merely illustrative, and other drawing can also be obtained by those skilled in the art based on these drawings without making creative work.

The structures, scales, sizes and the like depicted in the specification are only used by those skilled in the art to know and read the contents disclosed by the specification rather than to limit the embodiments of the present disclosure. Therefore, the structures, scales, sizes and the like do not have technically substantive meanings. Any modification, changes or adjustment to the structures, the scales and sizes shall all fall within the scope of protection covered by the technical contents disclosed by the present invention without affecting the effects and the purposes achieved by the present invention.

Figure 1:
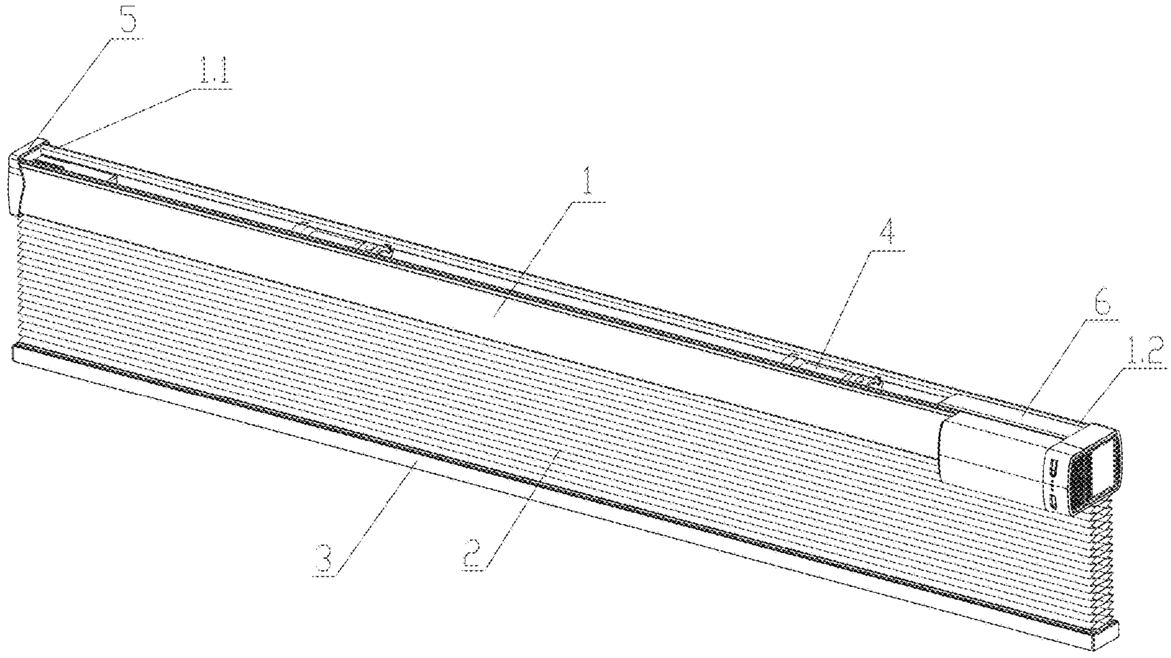
FIG. 1 is a structural schematic diagram of the present invention.

Numerals of the drawings are described below: 1. top rail, 1.1 first end, 1.2 second end, 1.3 slide groove, 1.4 fitting opening, 2. curtain body, 3. bottom bar, 4. rope winding assembly, 4.1 pull rope, 4.2 transmission rod, 4.3 rope winding device, 5. end seal, 6. drive device, 6.1 motor part, 6.1.1 third end, 6.1.2 fourth end, 6.1.3 clip, 6.1.4 input interface, 6.1.5 motor core, 6.1.6 speed reducer, 6.1.7 Hall plate, 6.1.8 signal magnet, 6.1.9 Hall sensor, 6.1.10 first magnetic block, first iron block, 6.1.11 transitional circuit board, 6.1.12 first vibration damping sleeve, 6.1.13 second vibration damping sleeve, 6.1.14 filling block, 6.2 power supply part, 6.2.1 slide block, 6.2.2 power supply, 6.2.3 second magnetic block, second iron block, 6.3 control part, 6.3.1 master control circuit board, 6.3.2 output interface.

DETAILED DESCRIPTIONS OF EMBODIMENTS

The present invention will be further described below in combination with specific embodiments.

In the descriptions of the present invention, it is understood that orientation or positional relationship indicated by the terms such as "central", "longitudinal", "transverse", "length", "width", "thickness", "upper", "lower", "front", "rear", "left", "right", "vertical", "horizontal", "top", "bottom", "inside", "outside", "clockwise" "counterclockwise" "axial", "radial", and "circumferential" is used only for ease of descriptions and simplification of descriptions and does not indicate or imply that the indicated devices or elements must have a particular orientation, or be constructed or operated in a particular orientation. Therefore, such terms shall not be understood as limiting of the present invention.

Further, the terms "first" and "second" are used for descriptions only and shall not be understood as indicating or implying relative importance or implicitly indicating the number of the indicated features. As a result, the features defined by "first" and "second" may explicitly or implicitly comprise at least one feature. In the descriptions of the present invention, the meaning of "several" refers to at least two, for example, two or three or the like, unless otherwise clearly stated.

In the present invention, unless otherwise clearly stated or defined, the terms "mount", "connect", "couple", and "fix" and the like shall be understood in a broad sense, for example, may be fixed connection, or detachable connection, or formed into one piece; or may be mechanical connection, or electrical connection; or direct connection or indirect connection through an intermediate medium, or may be internal communication between two elements or mutual interaction of two elements, unless otherwise stated. Those skilled in the art may understand the specific meanings of the above terms in the present invention according to actual situations.

In the present invention, unless otherwise clearly stated or defined, the first feature being "on" or "below" the second feature refers to that the first feature and the second feature are in direct contact, or the first feature and the second feature are in indirect contact through an intermediate medium. Furthermore, the first feature being "above" or "on" the second feature refers to that the first feature is exactly above or obliquely above the second feature, or only refers to that the first feature has a higher horizontal height than the second feature. The first feature being "under" or "below" the second feature refers to that the first feature is exactly under or obliquely below the second feature, or only refers to that the first feature has a smaller horizontal height than the second feature.

As shown in FIGS. 1 to 12, the present invention provides an electric curtain, comprising a top rail 1, a bottom bar 3, a curtain body 2, a rope winding assembly 4, a drive device 6 and an end seal 5. The top rail 1 and the bottom bar 3 are disposed in parallel up and down. The curtain body 2 is disposed between the top rail 1 and the bottom bar 3. The top rail 1 is provided with opposed first end 1.1 and second end 1.2. The end seal 5 is disposed at the first end 1.1 of the top rail 1. The drive device 6 is disposed at the second end 1.2 of the top rail 1. The drive device 6 is in transmission connection with the rope winding assembly 4 to drive the curtain body 2 to close or open. The drive device 6 comprises a motor part 6.1 and a power supply part 6.2. The motor part 6.1 is disposed inside the top rail land connected to the rope winding assembly 4 in a transmission manner. The power supply part 6.2 is disposed outside the top rail 1. The motor part 6.1 and the power supply part 6.2 are disposed in parallel inside and out.

In the present invention, the finished drive device 4 is in transmission connection with the rope winding assembly 4 to drive the curtain body 2 to open and close. The drive device 6 can be quickly mounted on or dismounted from the top rail 1. The drive device 6 integrates the motor part 6.1 and the power supply part 6.2 into one integral product, facilitating mounting modularization and mounting/dismounting and repairs. In addition, the motor part 6.1 and the power supply part 6.2 in the drive device 6 are disposed in parallel. In this case, the motor part 6.1 may be inserted into the top rail 1 to drive the rope winding assembly 4, and the power supply part 6.2 may be exposed outside the top rail 1, not occupying the internal mounting space of the top rail 1. Such structure shortens the entire length of the drive device 6 to enable the electric curtain to adapt to long and short windows, while the height of the top rail 1 will not be increased, thus avoiding increase of production costs. Further, after the motor part 6.1 and the power supply part 6.2 are integrated into one integral product, the power supply part 6.2 can also be mounted in an exposed manner, helping charging and maintenance.

Figure 2:
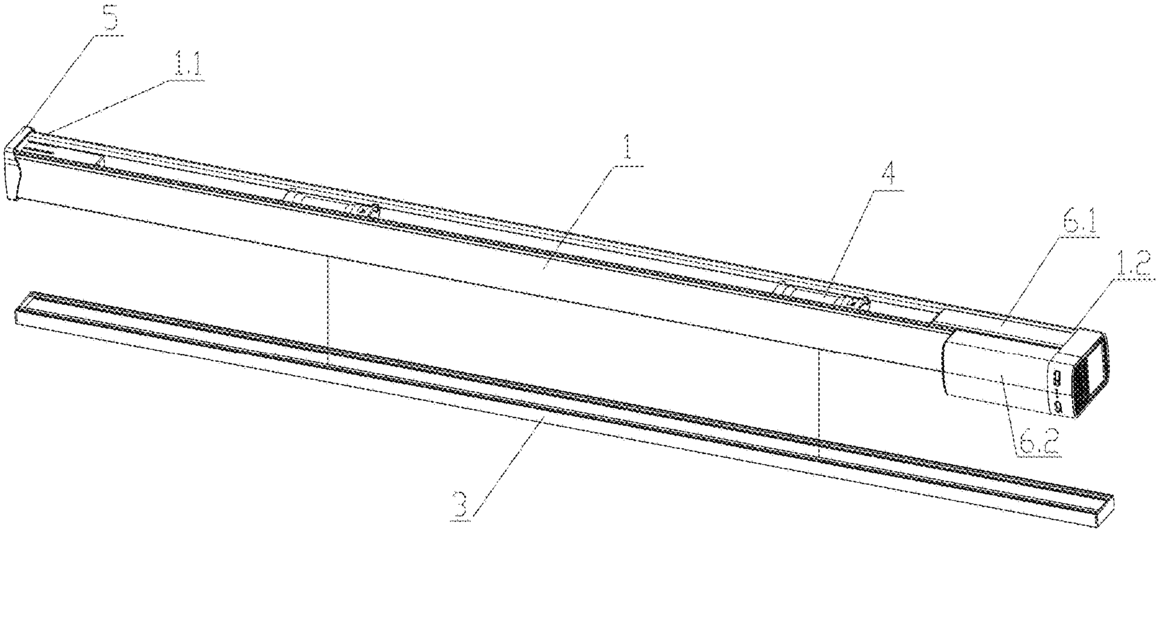
FIG. 2 is a structural schematic diagram without a curtain body in the present invention.
Figure 3:
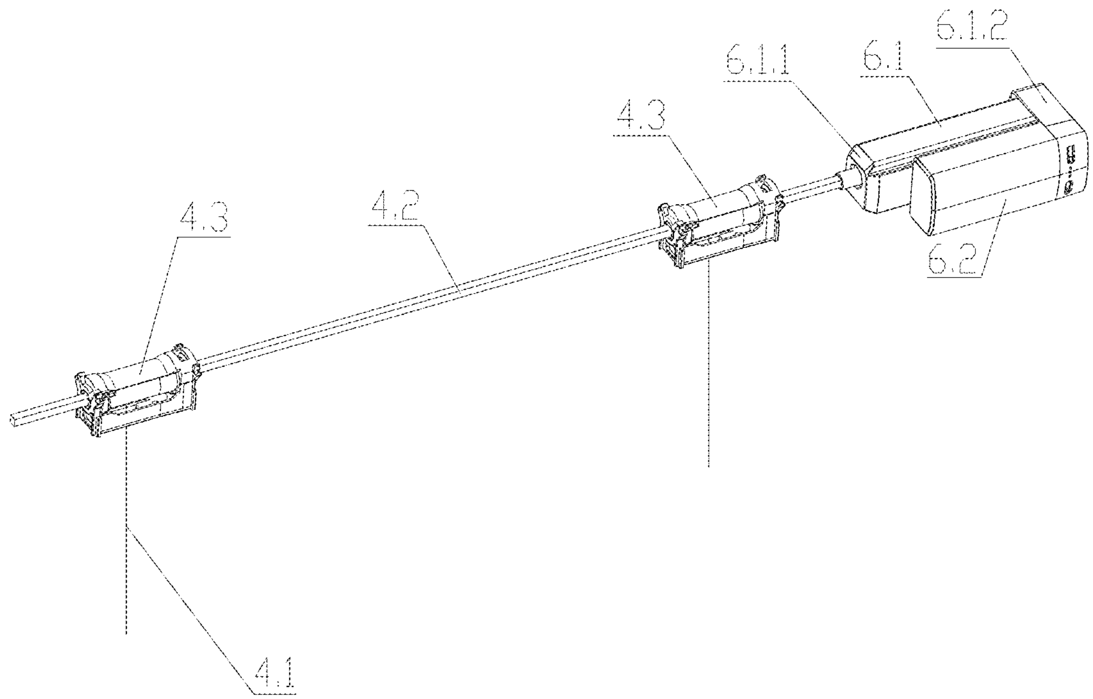
FIG. 3 is a schematic diagram illustrating a connection of a drive device and a rope winding assembly according to the present invention.

As shown in FIGS. 2 and 3, the rope winding assembly 4 comprises a pull rope 4.1, a transmission rod 4.2, and a rope winding device 4.3. The rope winding device 4.3 is disposed inside the top rail 1. The transmission rod 4.2 is in transmission connection with the motor part 6.1 and the rope winding device 4.3. One end of the pull rope 4.1 is fixedly connected to the rope winding device 4.3, and the other end runs sequentially through the top rail 1 and the curtain body 2 to be fixedly connected to the bottom bar 3. The motor part 6.1 works to drive the transmission rod 4.2 to rotate the rope winding device 4.3 to roll up and down the pull rope 4.1. Thus, the pull rope 4.1 can raise or lower the bottom bar 3, so as to fold and unfold the curtain.

Figure 4:
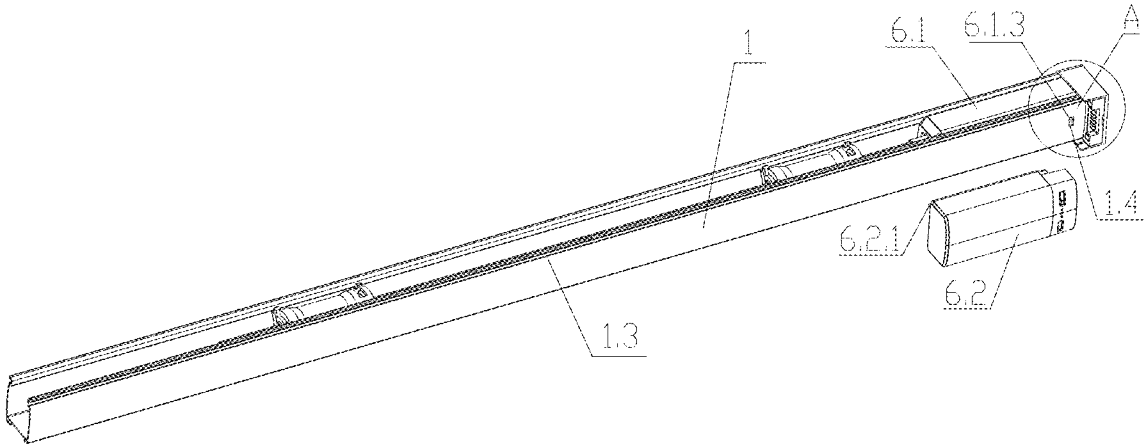
FIG. 4 is a structural schematic diagram of mounting and dismounting a power supply part of a drive device onto and from a top rail in the present invention.
Figure 6:
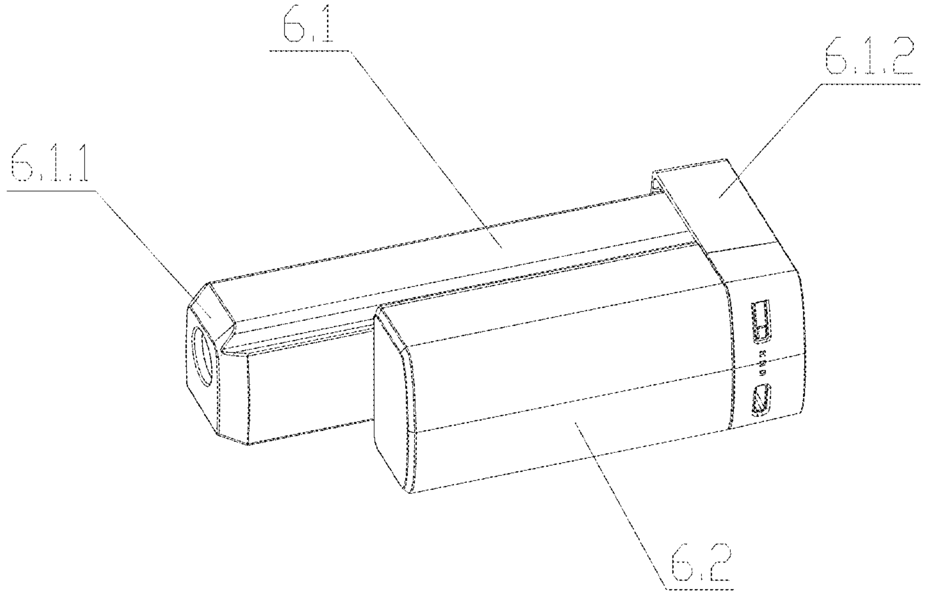
FIG. 6 is a structural schematic diagram of a drive device in the present invention.
Figure 7:
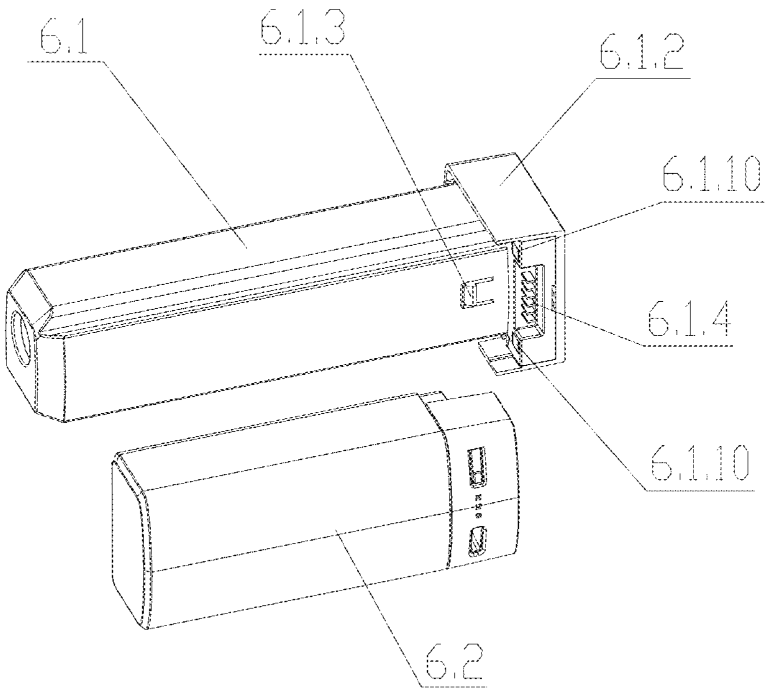
FIG. 7 is a schematic diagram of splitting a motor part and a power supply part of a drive device in the present invention.

As shown in FIGS. 4, 6, and 7, the motor part 6.1 is provided with opposed third end 6.1.1 and fourth end 6.1.2. The third end 6.1.1 of the motor part 6.1 is in transmission connection with the transmission rod 4.2, and the fourth end 6.1.2 of the motor part 6.1 is exposed at the second end 1.2 of the top rail 1 to detachably connect the power supply part 6.2. The power supply part 6.2 is detachably connected with the motor part 6.1. In this way, the power supply part 6.2 can be easily dismounted and also can be used flexibly to help charging and maintenance. During transport or storage process, the power supply part 6.2 can be dismounted to reduce potential safety hazards.

Figure 12:
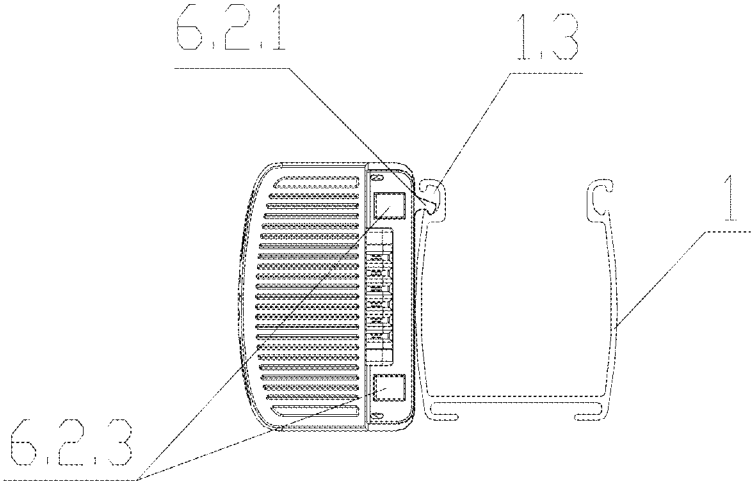
FIG. 12 is a side view illustrating a connection between a power supply part and a top rail according to the present invention.

As shown in FIGS. 4 and 12, a slide groove 1.3 penetrating through both ends of the top rail 1 along a length direction of the top rail 1 disposed on an external surface of the top rail 1. A slide block 6.2.1 slidably matched with the slide groove 1.3 is disposed on a back surface of the power supply part 6.2. With this structural disposal, the power supply part 6.2 can be slidably connected to the external surface of the top rail 1, where the external surface specifically refers to a front or back surface of the top rail 1. The power supply part 6.2 is preferably mounted on the front surface of the top rail 1 to facilitate mounting and dismounting of the power supply part 6.2. Furthermore, it is to be noted that if the power supply part 6.2 is mounted on a top surface of the top rail 1, a gap will be formed between the top surface of the top rail 1 and the window, affecting light blocking; if the power supply part 6.2 is mounted at a bottom surface of the top rail 1, assembling of the curtain body 2 may be affected; and if the power supply part 6.2 is mounted at a side surface, a gap may be formed between the curtain and a frame of the window, leaking light. Therefore, the power supply part 6.2 is preferably mounted on the front surface of the top rail 1, and the slide block 6.2.1 matches the slide groove 1.3. In this way, on one hand, the mounting or dismounting can be facilitated and on the other hand, vertical supporting can be achieved for the power supply part 6.2. Since the power supply part 6.2 and the motor part 6.1 are disposed in parallel inside and out, the detachable connection between the power supply part 6.2 and the motor part 6.1 is a horizontal connection. The motor part 6.1 is disposed inside the top rail 1, and the top rail 1 supports the weight of the motor part 6.1. The power supply part 6.2 is exposed outside the top rail 1. Due to its vertical gravity action, the power supply part 6.2 may be inclined downward over a long time of period, so as to pull the connection between the power supply part 6.2 and the motor part 6.1. The matching between the slide groove 1.3 the slide block 6.2.1 can achieve hanging and supporting effect for the power supply part 6.2 to resist the gravity of the power supply part 6.2 and reduce a pressure on the connection between the power supply part 6.2 and the motor part 6.1, and thus prolong its service life. Preferably, one slide block 6.2.1 is disposed. The slide block 6.2.1 is disposed at a position of the back surface of the power supply part 6.2 away from the fourth end 6.1.2 of the motor part 6.1.

Preferably, two slide blocks 6.2.1 may be disposed. The two slide blocks 6.2.1 are symmetrically disposed at the back surface of the power supply part 6.2. Further, the slide block 6.2.1 may be bent such that it can be slid onto or off any of both ends of the slide groove 1.3, or slid on or off a groove opening of the slide groove 1.3, so as to help dismount the power supply part 6.2 even when the curtain is mounted on the window.

Figure 5:
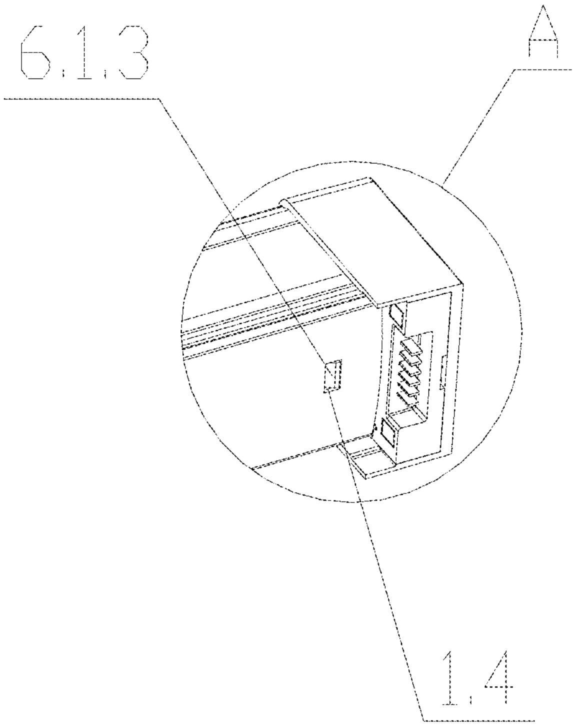
FIG. 5 is an enlarged view of position A in FIG. 4.

As shown in FIGS. 4, 5, and 7, at least one clip 6.1.3 for fitting onto the top rail 1 is disposed on an external wall of the motor part 6.1. A fitting opening 1.4 matching the clip 6.1.3 is disposed on a side wall of the top rail 1. When the drive device 6 is inserted from the second end 1.2 of the top rail 1, the clip 6.1.3 on the motor part 6.1 is fitted to the fitting opening 1.4 on the side wall of the top rail 1, and hence the drive device 6 can be limited from running along the length direction of the top rail 1, thereby achieving fixing and liming effect. This fitting structure can replace screwed connection and achieve faster assembling without any auxiliary assembling tool. Further, there is no problem of screw loss or trivial parts, and thus entire structure is simpler.

Figure 8:
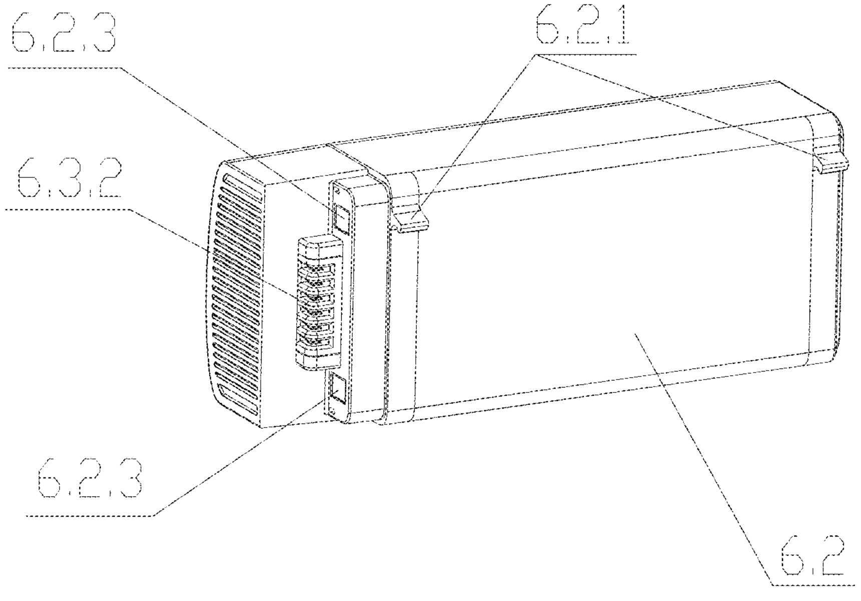
FIG. 8 is a structural schematic diagram of a power supply part in the present invention.
Figure 9:
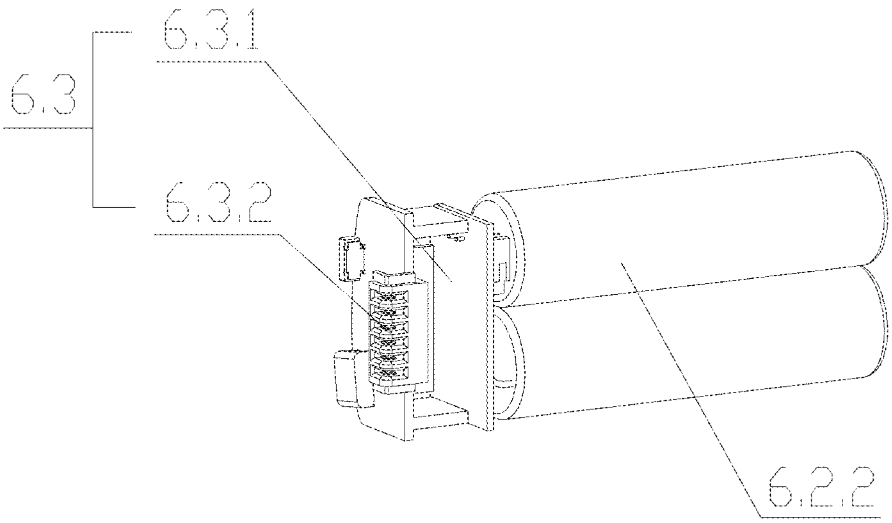
FIG. 9 is a schematic diagram of an internal structure of a power supply part in the present invention.

As shown in FIGS. 8 and 9, the drive device 6 may further comprise a control part 6.3 for controlling the motor part 6.1 to work. The power supply part 6.2 is used to supply electricity and the motor part 6.1 is used to output power. The control part 6.3 comprises a master control circuit board 6.3.1 which is disposed inside the power supply part 6.2. A power supply 6.2.2 in electrical connection with the master control circuit board 6.3.1 is disposed inside the power supply part 6.2. An output interface 6.3.2 is disposed in an exposed manner at a position close to the fourth end 6.1.2 of the motor part 6.1 on the master control circuit board 6.3.1. An input interface 6.1.4 connected to the output interface 6.3.2 is disposed in an exposed manner at the fourth end 6.1.2 of the motor part 6.1. Power transmission and communication can be achieved between the input interface 6.1.4 and the output interface 6.3.2. Compared with wire welding, the connection is more convenient and can be connected or disconnected repeatedly, facilitating quick dismounting of the power supply part 6.2.

Figure 11:
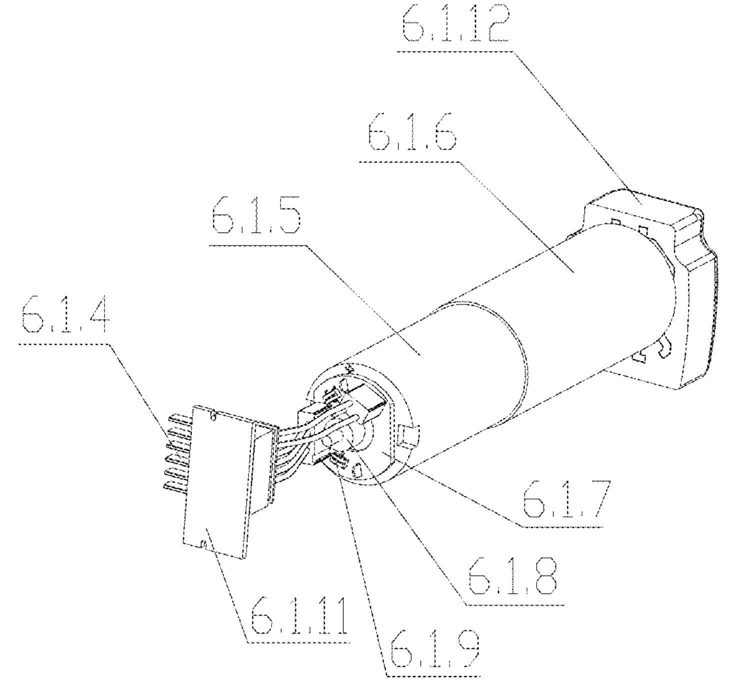
FIG. 11 is a schematic diagram illustrating a connection between a Hall plate and a transitional circuit board in a motor part according to the present invention.

As shown in FIG. 11, the motor part 6.1 is internally provided with a motor core 6.1.5 and a speed reducer 6.1.6. The motor core 6.1.5 in transmission cooperation with the speed reducer 6.1.6 is connected fixedly with the speed reducer 6.1.6. The speed reducer 6.1.6 is close the third end 6.1.1 of the motor part 6.1, and the motor core 6.1.5 is close to the fourth end 6.1.2 of the motor part 6.1. An output end of the motor core 6.1.5 is in transmission connection with an input end of the speed reducer 6.1.6, and an output end of the speed reducer 6.1.6 is in transmission connection with the transmission rod 4.2. An end of the motor core 6.1.5 away from the speed reducer 6.1.6 is provided with a Hall plate 6.1.7 and a signal magnet 6.1.8. The Hall plate 6.1.7 is in electrical connection with the motor core 6.1.5. A Hall sensor 6.1.9 for sensing the signal magnet 6.1.8 is disposed on the Hall plate 6.1.7. The signal magnet 6.1.8 and the output end of the motor core 6.1.5 rotate coaxially. The Hall sensor 6.1.9 senses the rotation of the signal magnet 6.1.8 so as to sense a number of turns that the motor core 6.1.5 rotates. The fourth end 6.1.2 of the motor part 6.1 is internally provided with a transitional circuit board 6.1.11 which is in electrical connection with the Hall plate 6.1.7. The input interface 6.1.4 is disposed on the transitional circuit board 6.1.11. The disposal of the transitional circuit board 6.1.11 facilitates detachable connection with the power supply part 6.2. The master control circuit board 6.3.1 in the power supply part 6.2 needs to be electrically connected with the Hall plate 6.1.7 for power transmission and communication. But, the motor part 6.1 and the power supply part 6.2 are disposed in parallel inside and out, and the Hall plate 6.1.7 is disposed at the tail of the motor core 6.1.5, namely, disposed inside the motor part 6.1, which brings inconvenience to the electrical connection between the power supply part 6.2 and the motor part 6.1. As a result, the transitional circuit board 6.1.11 is used as a transition. For this purpose, the input interface 6.1.4 is disposed at an end of the fourth end 6.1.2 to facilitate connection with the output interface 6.3.2, thereby achieving power transmission, communication and easy dismounting/mounting.

Figure 10:
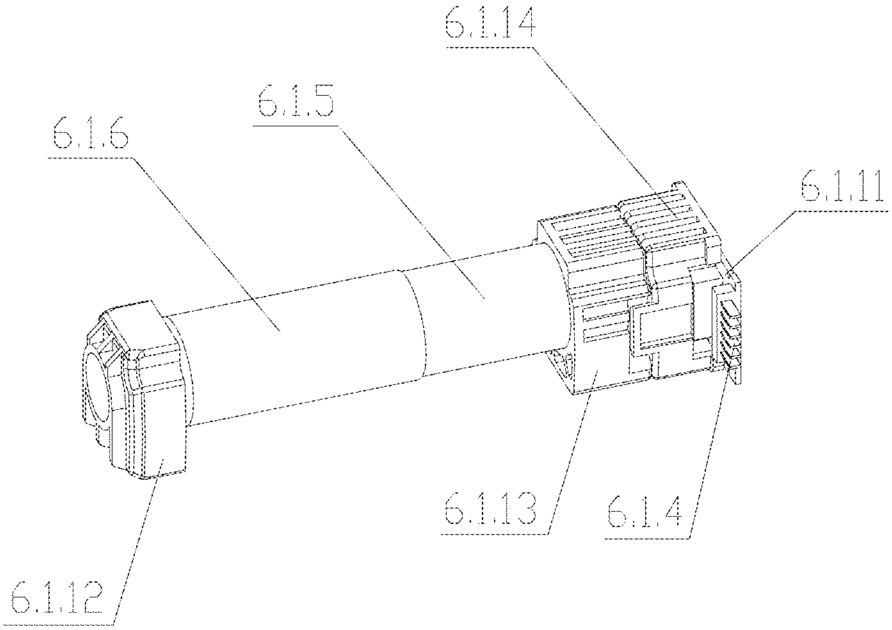
FIG. 10 is a schematic diagram of an internal structure of a motor part in the present invention.

As shown in FIG. 10, a first vibration damping sleeve 6.1.12 is connected at an end of the speed reducer 6.1.6 away from the motor core 6.1.5, and a second vibration damping sleeve 6.1.13 is disposed at an end of the motor core 6.1.5 away from the speed reducer 6.1.6. The first vibration damping sleeve 6.1.12 and the second vibration damping sleeve 6.1.13 may be of annular structure or semi-circular or large semicircular structure for preventing the motor core 6.1.5 and the speed reducer 6.1.6 from directly contacting a housing of the motor part 6.1. In this way, the original hard connection is replaced with soft connection, where the hard connection refers to the motor core 6.1.5 and the speed reducer 6.1.6 are directly fixed inside the housing of the motor part 6.1, and the soft connection refers to the motor core 6.1.5 and the speed reducer 6.1.6 are fixed inside the housing of the motor part 6.1 through the first vibration damping sleeve 6.1.12 and the second vibration damping sleeve 6.1.13. The first vibration damping sleeve 6.1.12 and the second vibration damping sleeve 6.1.13 can filter and absorb vibrations generated by the motor core 6.1.5 and the speed reducer 6.1.6, and thus reduce vibration transferred from the motor core 6.1.5 and the speed reducer 6.1.6 to the housing the motor part 6.1, thereby achieving vibration damping and noise reduction. The first vibration damping sleeve 6.1.12 and the second vibration damping sleeve 6.1.13 are made of a flexible material, for example, silicon rubber.

As shown in FIG. 10, a filling block 6.1.14 is disposed at an end of the motor core 6.1.5 away from the speed reducer 6.1.6 in the motor part 6.1. The filling block 6.1.14 is abutted against the second vibration damping sleeve 6.1.13 to fill a gap between the motor core 6.1.5 and the fourth end 6.1.2 of the motor part 6.1. In this case, the motor core 6.1.5 and the speed reducer 6.1.6 can be better axially limited and axial runoff of the motor core 6.1.5 and the speed reducer 6.1.6 can be prevented.

As shown in FIGS. 7 and 8, the fourth end 6.1.2 of the motor part 6.1 is provided with at least one first magnet and/or first iron block 6.1.10, and an end of the power supply part 6.2 for docking with the motor part 6.1 is provided with a second magnetic block and/or second iron block 6.2.3 for magnetically attracting the first magnetic block and/or first iron block 6.1.10. This structural disposal can achieve further fixing effect to ensure the power supply part 6.2 and the motor part 6.1 are stably connected and also protect stable connection between the output interface 6.3.2 and the input interface 6.1.4, avoiding short service life caused by damage to the interfaces due to vibrations or the like. Furthermore, the magnetic attraction structure help achieves quick dismounting/mounting with less labor and time. Compared with screwed fixing, the magnetic attraction structure does not require any auxiliary tool for tightening screws nor bring the problem of screw loss. With fewer parts to be assembled, the assembling process will be simpler and easier.

In addition, in the present invention, the master control circuit board 6.3.1 is a microcontroller unit (MCU) board which disposed inside the power supply part 6.2. The MCU board is disposed outside the top rail 1 together with the power supply part 6.2. The top rail 1 is usually made of metal material, for example, aluminum profile, which may shield remote control signals. The housing of the power supply part 6.2 is made of a plastic which does not shield remote control signals. Hence, the MCU board may be disposed outside the top rail 1 to better receive remote control signals. An indicator lamp, a setting key and a data interface are disposed on the MCU board, and windows respectively corresponding to the indicator lamp, the setting key and the data interface are disposed on the housing of the power supply part 6.2. The data interface may be a USB interface for charging or plugging or data communication. The setting key is used to key binding, direction change and factory setting restore. The indicator lamp is used to display a working state. An antenna or onboard antenna is disposed on the MCU board to receive external signals. The power supply 6.2.2 used in the present invention may be a lithium battery, dry cell or switching power supply.

Furthermore, it is noted that, the housings of the motor part 6.1 and the power supply part 6.2 both are plastic housings. The housing of the motor part 6.1 can completely wrap the parts in the motor part 6.1 with only the power output end and the input interface 6.1.4 exposed. The housing the power supply part 6.2 can completely wrap the parts in the power supply part 6.2 with only the output interface 6.3.2 exposed. When the power supply part 6.2 is connected with the motor part 6.1, the output interface 6.3.2 is inserted into the input interface 6.1.4. Only the power output end in the entire drive device 6 is exposed so as to achieve protection effect and prevent short-circuiting and dusts. The housings of the motor part 6.1 and the power supply part 6.2 completely isolate the parts in the motor part 6.1 and the power supply part 6.2 from the outside, presenting a clean and good entire structure. Since the top rail 1 is usually made of a metal material and therefore, there may be metal debris insides. When the motor part 6.1 is inserted into the top rail 1, the housing of the motor part 6.1 can isolate the parts therein from the interior of the top rail 1, so as to prevent the metal debris from entering the motor part 6.1, leading to short circuiting.

The materials, reagents and test devices involved in the present invention will be commercially available products complying with requirements of the electric curtains, unless otherwise stated.

It should be noted that the above embodiments are only used to describe the technical solutions of the present invention rather than limit the present invention. Although the present invention is detailed by referring to the above embodiments, those skilled in the art may understand that the technical solutions recorded in the above embodiments may be modified or some of technical features therein are equivalently replaced. These modifications or replacements will not cause the corresponding technical solution to depart from the spirit and scope of the technical solutions of the embodiments of the present invention.

The invention claimed is:

1. An electric curtain, comprising: a top rail, a bottom bar, a curtain body, a rope winding assembly, a drive device and an end seal; wherein the top rail and the bottom bar are disposed in parallel; the curtain body is disposed between the top rail and the bottom bar;

the top rail is provided with opposed first and second ends; the end seal is disposed at the first end of the top rail; the drive device is disposed at the second end of the top rail; the drive device is in transmission connection with the rope winding assembly to drive the curtain body to close or open; the drive device comprises a motor part and a power supply part; the motor part is disposed inside the top rail and connected to the rope winding assembly in a transmission manner; the power supply part is disposed outside the top rail; the motor part and the power supply part are disposed in parallel;

the rope winding assembly comprises a pull rope, a transmission rod, and a rope winding device; the rope winding device is disposed inside the top rail; the transmission rod is in transmission connection with the motor part and the rope winding device; one end of the pull rope is fixedly connected to the rope winding device, and the other end runs sequentially through the top rail and the curtain body to be fixedly connected to the bottom bar; and the motor part is provided with opposed third and fourth ends; the third end of the motor part is in transmission connection with the transmission rod, and the fourth end of the motor part is exposed at the second end of the top rail to detachably connect the power supply part.

2. The electric curtain of claim 1, wherein a slide groove penetrating through both ends of the top rail along a length direction of the top rail disposed on an external surface of the top rail; a slide block slidably matched with the slide groove is disposed on a back surface of the power supply part.

3. The electric curtain of claim 1, wherein at least one clip for fitting onto the top rail is disposed on an external wall of the motor part, and a fitting opening matching the clip is disposed on a side wall of the top rail.

4. The electric curtain of claim 1, wherein the fourth end of the motor part is provided with at least one first magnet and/or first iron block, and an end of the power supply part for docking with the motor part is provided with a second magnetic block and/or second iron block for magnetically attracting the first magnetic block and/or first iron block.

5. The electric curtain of claim 1, wherein the drive device further comprises a control part, and the control part comprises a master control circuit board; the master control circuit board is disposed inside the power supply part; a power supply is disposed inside the power supply part, and the power supply is in electrical connection with the master control circuit board; an output interface is disposed in an exposed manner at a position close to the fourth end of the motor part on the master control circuit board; an input interface connected to the output interface is disposed in an exposed manner at the fourth end of the motor part.

6. The electric curtain of claim 5, wherein the motor part is internally provided with a motor core and a speed reducer; the motor core and the speed reducer are in transmission cooperation and fixedly connected; the speed reducer is close to the third end of the motor part, and the motor core is close to the fourth end of the motor part; an output end of the motor core is in transmission connection with an input end of the speed reducer, and an output end of the speed reducer is in transmission connection with the transmission rod; an end of the motor core away from the speed reducer is provided with a Hall plate and a signal magnet; a Hall sensor for sensing the signal magnet is disposed on the Hall plate; the fourth end of the motor part is internally provided with a transitional circuit board, and the transitional circuit board is in electrical connection with the Hall plate; the input interface is disposed on the transitional circuit board.

7. The electric curtain of claim 6, wherein a first vibration damping sleeve is connected at an end of the speed reducer away from the motor core, and a second vibration damping sleeve is disposed at an end of the motor core away from the speed reducer.

8. The electric curtain of claim 7, wherein a filling block is disposed at an end of the motor core away from the speed reducer in the motor part; the filling block is abutted against the second vibration damping sleeve to fill the gap between the motor core and the fourth end of the motor part.

* * * * *